(12) United States Patent
Caty et al.

(10) Patent No.: US 6,791,357 B2
(45) Date of Patent: Sep. 14, 2004

(54) BUS SIGNAL HOLD CELL, BUS SYSTEM, AND METHOD

(75) Inventors: Olivier Caty, München (DE); Volker Schöber, München (DE)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 10/132,780

(22) Filed: Apr. 25, 2002

(65) Prior Publication Data

US 2003/0052706 A1 Mar. 20, 2003

(30) Foreign Application Priority Data

Apr. 25, 2001 (DE) .......................................... 101 20 282

(51) Int. Cl.[7] .......................................... H03K 19/0175
(52) U.S. Cl. .............................. 326/86; 326/46; 326/58
(58) Field of Search ............................. 326/86, 83, 57, 326/58, 46

(56) References Cited

U.S. PATENT DOCUMENTS 5,834,949 A * 11/1998 Oba ............................ 326/86

6,577,157 B1 * 6/2003 Cheung et al. ............... 326/38

FOREIGN PATENT DOCUMENTS

DE 31 37 902 A1 4/1983
EP 0 530 835 M1 3/1993

* cited by examiner

*Primary Examiner*—Daniel Chang
(74) *Attorney, Agent, or Firm*—Laurence A. Greenberg; Werner H. Stemer; Gregory L. Mayback

(57) ABSTRACT

The invention relates to an integrated bus signal hold cell that is coupled with a bus line via a common input/output, and that has at least two inverters for holding the last state of the bus line. The outputs of the inverters are coupled with each other's inputs, respectively. The input of the first inverter is coupled with the input/output. The output of the second inverter is coupled with the input/output. An additional input is provided via which the bus signal hold cell can be charged with a defined test signal. The invention also relates to an integrated bus system and a method for driving a bus signal hold cell and a bus system.

17 Claims, 4 Drawing Sheets

Hold Cell

Hold Cell

Hold Cell

Hold Cell

BUS SIGNAL HOLD CELL, BUS SYSTEM, AND METHOD

BACKGROUND OF THE INVENTION

Field of the Invention

The invention relates to a bus signal hold cell, a bus system with such a cell, and a method for operating the bus signal hold cell.

It is generally known that busses and bus systems are produced by interconnecting distributed information sources (transmitters) and sinks (receivers) via decentralized multiplexers and gate circuits. A bus system is thus a device which mediates the data exchange between the subscribers which are connected to the bus.

Functionally, a bus is a node with switches and taps in a star configuration. Technically, a bus system consists of at least one bus line and a plurality of subscribers that are connected to the line or lines. On the basis of the multiplexer function of the bus, only one subscriber (source) may ever transmit, i.e. switch data onto the bus. To this end, with the exception of the output of the subscriber sending the data, the outputs of all remaining subscribers are switched into the high-resistance state. This makes possible a very simple and flexible data intercommunication of the subscribers which are connected to the bus system.

In case no data are presently being written onto the bus, the outputs of all connected subscribers are switched into a high-resistance state. To this end, the bus includes a termination device which holds the last item of data that was driven over the bus whenever the outputs of all subscribers are in a state of high resistance.

Such a bus termination device can be realized in the form of a terminating resistor—for instance a transistor which is constructed as a high-side or low-side switch. Such pull-up or pull-down transistors are very compact and require only a small space on the chip because of their small number of components. In any case, such terminating resistors have an additional leakage current to ground, which leads to an undesirable dissipation. If this leakage current and the associated dissipation were negligible in earlier bus systems, they now play a larger, predominant role given the progressive integration density in integrated circuits and the trend toward ever smaller operating voltages relative to the occupied chip area.

Highly complex bus systems in scan-based integrated semiconductor circuits, in particular, often include a bus signal hold cell that is provided with a storage element having a weak driving capacity as the terminating device for a bus line.

FIG. 1 represents a basic circuit diagram of such a bus signal hold cell 2 that is connected to a bus line 1. The bus signal hold cell 2 here includes two drivers 3,4 which are constructed as inverters, whose outputs control each other's inputs, respectively. When there are no longer any subscribers authorized to write, the last signal driven over the bus line 1 is held at the last logic state by the second driver 4.

In contrast to the bus termination devices that are high-side or low-side switches, a bus signal hold cell has a greater number of transistors, but these advantageously generate almost no dissipation in operation.

When a bus system has no bus termination device, the bus signals can float, i.e., can have an undefined potential. As a result, the respective transistors of the driver elements that are connected to the bus line could even blow out in extreme cases.

In order to test an integrated circuit, it is necessary to charge the bus lines of a bus with defined, i.e. strictly prescribed, signals (controllability) and to read back the results for further evaluation (observability). In the case of a bus signal hold cell that will be tested using an ATPG (Automatic Test Pattern Generation) tool, this controllability and observability, which are necessary for testing a module, are not supported in all cases. Thus, the bus signal hold cell should exhibit the last condition written over the bus, however, it is impossible to determine with absolute certainty which signal is actually stored in the bus signal hold cell. For instance, the bus signal hold cell could include a condition other than the last condition driven over the bus because of a defect of the bus line or the inverters of the bus signal hold cell. But this cannot be determined with a known bus signal hold cell. The reduced controllability and observability for testing the bus signal hold cell lead to a reduction of the test coverage of these modules, that is to say, an elevated testing expenditure.

Another problem arises with respect to the testability of a plurality of macros that are interconnected on the chip via bus lines. In many cases, these highly complex macromodules cannot control and observe the respective bus lines to which they are connected during a test operation. This, too, leads to a reduced test coverage for automatically generated test patterns for testing macros. Very often this automatic test pattern generation is even impossible, so that only manual test patterns are possible, whose generation, implementation and evaluation are very expensive.

In order to increase the controllability and observability of an integrated circuit—that is, a module of an integrated circuit—partially test-friendly design measures are coupled to the inputs and outputs, which should make it possible to test this module. These test devices, which nevertheless undesirably increase the expended chip area, also reduce the efficiency of the overall circuit arrangement.

SUMMARY OF THE INVENTION

It is accordingly an object of the invention to provide an integrated bus signal hold cell, a method for driving the bus signal hold cell, and an integrated bus which overcome the above-mentioned disadvantages of the prior art apparatus and methods of this general type.

In particular, it is an object of the invention to improve the testability of bus systems and bus lines of an integrated circuit.

With the foregoing and other objects in view there is provided, in accordance with the invention, an integrated bus signal hold cell that includes: a common input/output for coupling with a bus line; and at least a first inverter and a second inverter for holding a last condition of the bus line. Each one of the first inverter and the second inverter has an output and an input. The output of the first inverter is coupled to the input of the second inverter, and the output of the second inverter is coupled to the input of the first inverter. The integrated bus signal hold cell also includes an additional input for inputting a defined test signal. The input of the first inverter is coupled with the input/output. The output of the second inverter is coupled with the input/output.

With the foregoing and other objects in view there is also provided, in accordance with the invention, an integrated bus system, with a bus including at least one bus line having a high-resistance state and a low-resistance state. At least one subscriber is connected to the bus line. The subscriber is writing and/or reading signals onto or from the bus line.

At least one bus signal hold cell is connected to the bus line. The bus signal hold cell includes a common input/output coupled with the bus line, and at least a first inverter and a second inverter for holding a last logic state of the bus line. Each one of the first inverter and the second inverter has an output and an input. The output of the first inverter is coupled to the input of the second inverter. The output of the second inverter is coupled to the input of the first inverter. The bus signal hold cell also includes an additional input for inputting a defined test signal. The input of the first inverter is coupled with the input/output. The output of the second inverter is coupled with the input/output. The bus signal hold cell stores the last logic state on the bus line in the high-resistance state of the bus line.

With the foregoing and other objects in view there is also provided, in accordance with the invention, a method for driving an integrated bus signal hold cell, which includes the steps of:

providing a bus line having a high-resistance state and a low resistance state;

providing a bus signal hold cell including:
a common input/output coupled with the bus line,
at least a first inverter and a second inverter for holding a last signal driven over the bus line, each one of the first inverter and the second inverter having an output and an input, the output of the first inverter coupled to the input of the second inverter, the output of the second inverter coupled to the input of the first inverter, and
an additional input for inputting a defined test signal, the input of the first inverter coupled with the input/output, and
the output of the second inverter coupled with the input/output;

providing the bus signal hold cell with an operating mode in which, when the bus line is in the high-resistance state, the last signal that was driven over the bus line is saved in the bus signal hold cell; and providing the bus signal hold cell with a test mode, in which the defined test signal is written into the bus signal hold cell using the additional input.

According to the invention, as with a scan register element, test patterns which are defined in the test operation can be written onto a bus line, and the resulting test results can be read out by the bus, i.e. the bus signal hold cell. This new functionality of a bus signal hold cell, i.e. both controllability and observability of the test results, is possible without limiting or reducing bus system performance.

In order to improve controllability, the inventive bus signal hold cell includes an additional input via which the bus signal hold cell can be set to a prescribed fixed value. The impressing of the defined test signal, for instance a logic one or zero, into the bus signal hold cell is typically achieved using the driver of a push-pull output stage or a high-side or low-side switch.

The inventive bus signal hold cell includes at least two inverters. Generally, inverter also means driver. In particular, any drive circuit exhibiting the functionality of an inverter can be utilized as an inverter. What is known as a pass transistor (filter) can also be used as an inverter. A pass transistor consists of an n-channel transistor and a p-channel transistor, whose load terminals (outputs) and control terminals (inputs) are interconnected. One of these transistors, respectively, is switched through by the logic "0" or "1" on the input side and charges an in-series capacitor. Because the other transistor remains blocked, the capacitor functions as a memory which saves the last state.

The first driver (known as the main driver) of the bus signal hold cell has a larger drive power than the second, recessive driver. But it would also be imaginable for both drivers to have equal drive power.

In a development of the invention, the bus signal hold cell has an additional serial output. Using this additional output, when test patterns are read serially into the additional input, corresponding test responses can be read without an additional capacitive load having to be coupled to the bus line. This additional data exchange creates the possibility of observability of the bus signal hold cell and with it the connected bus lines, which represents a highly advantageous enhancement of functionality compared to previously known circuit arrangements.

The bus signal hold cell includes two known inverters. The first inverter of the bus signal hold cell is inventively constructed as a multiplexer; i.e., its inputs can be switched back and forth between a bus terminal and the additional input. This way, the signal to be impressed into the bus signal hold cell can be alternatively applied by the input/output as well and thus over the bus line. The additional input increases the controllability of the bus signal hold line and thus that of the connected bus line. This is highly relevant to testing purposes, because the exact condition of the bus line is now known.

A very large number of interconnecting lines are required for a bus signal hold cell having an additional serial data input and an additional serial data output in addition to the primary input/output for the bus line. In order to avoid this wiring expenditure, it is expedient to interpose a shift register arrangement between the additional data input and the additional data output. Such a shift register can be realized as a flip-flop that includes two latches connected in series. Each latch includes a driver that is realized as an inverter in the signal path, and a driver that is realized as an inverter in the feedback path. In a typical embodiment, the inverters in the signal path of the latches are constructed as multiplexers.

In a highly advantageous development, a feedback inverter of a latch is constructed in such a way that it replaces the main inverter of the bus signal hold cell in normal operation.

A problem arises in the testing of bus systems in highly complex integrated circuits (for instance memory modules), in which the bus consists of a plurality of very long bus lines. In test-friendly bus systems, the ends of the individual bus lines can be linked to one another so as to produce a single extra-long line from the overall bus. In this technique, the parallel bus lines of the bus system are connected in succession from a test data input to a test data output. Because there are no drive elements in the signal path of the emerging extra-long bus line between the test data input and the test data output, this line can be driven in both directions. But in this arrangement, the signals that are to be driven over the long bus line can be "worn away" between the input and output; i.e., the signal at the output can no longer be definitively recognized. This problem arises in extra-long bus lines, in particular, given an increase in signal frequency and a reduction of the signal amplitude.

In a particularly advantageous development of the invention, a bus system is provided which includes an inventive bus signal hold cell with an additional serial data input and/or output, whereby each bus signal hold cell is allocated to a respective bus line. These bus signal hold cells are split in the test operation, so that they no longer exhibit storing behavior, but merely a drive functionality. To accomplish this, the respective data input of a bus signal hold cell is coupled with another bus line so as to produce a single contiguous signal line. A test signal can be applied at the input of the signal line, and a test response can be read at the output. A unidirectional signal path thereby emerges in the test operation. In the test operation over the signal line, a driven signal is amplified by each of the bus signal hold cells, so that the test signal is not "worn away" in this case. Advantageously, it is also possible to test the drive capability of the bus signal hold cell, specifically of the weak bus drivers, when the bus lines of the bus system are connected into a single signal line.

In an advantageous development, the bus signal hold cells are connected to the end of a respective bus line. The bus signal hold cells thus function as a line termination, obviating the need for additional devices such as resistors and transistors for the line termination.

In a development of the invention, the bus signal hold cells can be so configured that they can be coupled with any arbitrary bus line. It is possible to provide any number of new modules in a bus system this way. Each end point of a bus line can be provided with a bus signal hold cell that can be set up in any way, and configured via a configuration network or a control device. This way, a highly flexible bus system can be provided, in which it is no longer necessary to definitively allocate the bus lines (hard wiring), but rather which can have any configuration.

For instance, in one configuration, data can be transferred over a particular bus line. In a second configuration, the same bus line is connected to another bus signal hold cell and address data are transferred. In a third configuration, multiplexed data and address signals are transferred over the same bus line.

Given the interconnection of various bus signal hold cells and bus lines, an application is possible in which highly complex bus systems can be tested with high reliability without degrading performance. This kind of functionality is impossible in known scan-based integrated circuits. The invention is thus suitable above all for testing bus systems of scan-based integrated circuits.

Given the appropriate wiring, a number of different functionalities can be provided with the inventive bus signal hold cell, which will now be briefly described:

The bus signal hold cell can control the contents of a bus line in the test operation.

In the test operation, the bus signal hold cell can be switched so that its value is stored using a synchronization signal.

The value written onto the bus line can be observed.

The bus signal hold cell can be switched transparently between the test input and the bus terminal.

The bus signal hold cell can be switched transparently between the bus terminal and the test output.

Advantageous developments and embodiments of the invention are subject matter of the additional subclaims and the description in connection with the drawing.

Other features which are considered as characteristic for the invention are set forth in the appended claims.

Although the invention is illustrated and described herein as embodied in a bus signal hold cell, bus system, and method, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
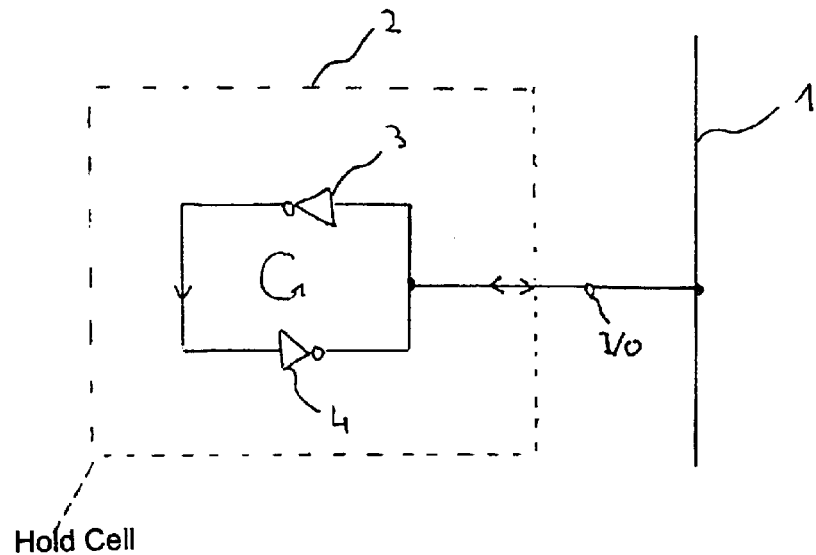
FIG. 1 is a circuit diagram of a known bus signal hold cell.
Figure 2:
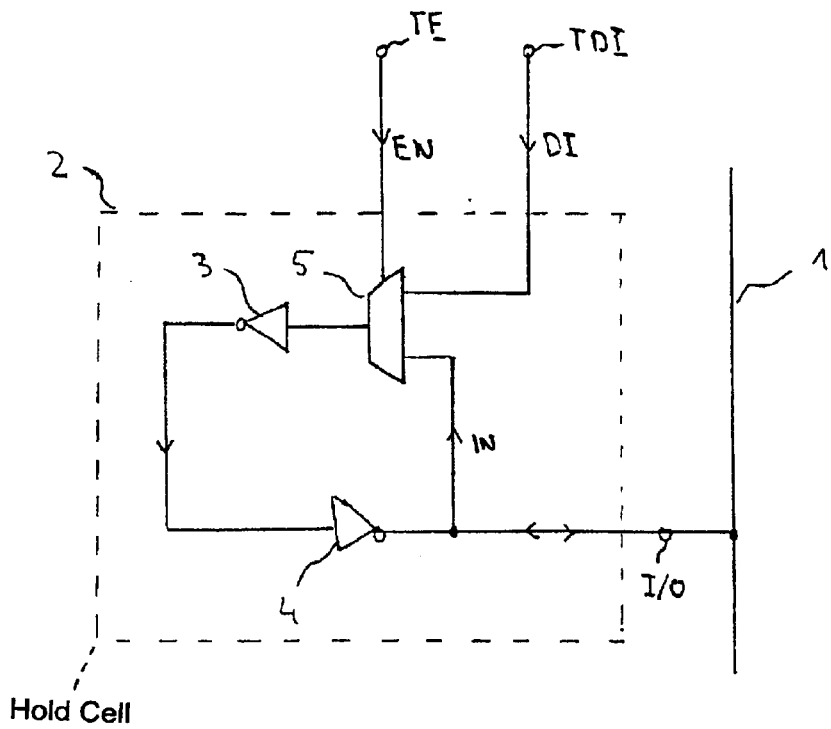
FIG. 2 is a circuit diagram of an inventive bus signal hold cell having an additional data input.

Unless otherwise noted, identical or functionally identical elements and signals are assigned the same reference characters in the figures. Referring now to the figures of the drawing in detail and first, particularly, to FIG. 2 thereof, there is shown a bus signal hold cell 2 that is connected to a bus line 1 by its primary input/output I/O. The input/output I/O can be driven bidirectionally; i.e., data can be read from the bus, and data of the bus signal hold cell 2 can be written onto the bus line 1. The bus signal hold cell 2 includes two drivers 3, 4 that are realized as inverters. The output of each driver 3, 4 controls the input of the respective other driver 3, 4. The input of the first driver 3 is connected to the bus line 1 via the input/output I/O. The output of the second driver 4 is connected to the bus line 1 via the input/output I/O. In the present exemplary embodiment, the first driver 3 has a higher drive power than the second, recessive driver 4. The second inverter could also be realized as a high-impedance-switchable inverter.

The drive power of the second, recessive driver 4 is dimensioned such that it is less than the drive power of the weakest subscriber connected to the bus line 1. This guarantees that, in case one of the subscribers connected to the bus line 1 wants to transmit data, this driver 4 exhibits recessive behavior and allows the data transmission of the subscriber. It would also be possible to increase the drive power of the first and/or second driver 3, 4 or to make this adjustable.

The bus signal hold cell 2 inventively includes an additional serial data input TDI, via which a test signal DI can be appplied into the bus signal hold cell 2. The additional data input TDI is coupled with the input of the first driver 3 in this case. A multiplexer configuration 5 is arranged between the input of the driver 3 and the data input TDI, as well as between the input of the driver 3 and the input/output I/O. A control input TE is provided for controlling the multiplexer configuration 5, via which the multiplexer configuration 5 can be charged with a control signal EN.

The bus signal hold cell 2 has two operating modes: a normal mode and a test mode. In the normal mode, the multiplexer 5 is controlled such that a bus signal IN is input to the inverter 3. In the test mode, on the other hand, the test signal DI is switched onto the inverter via the data input TDI.

Figure 3:
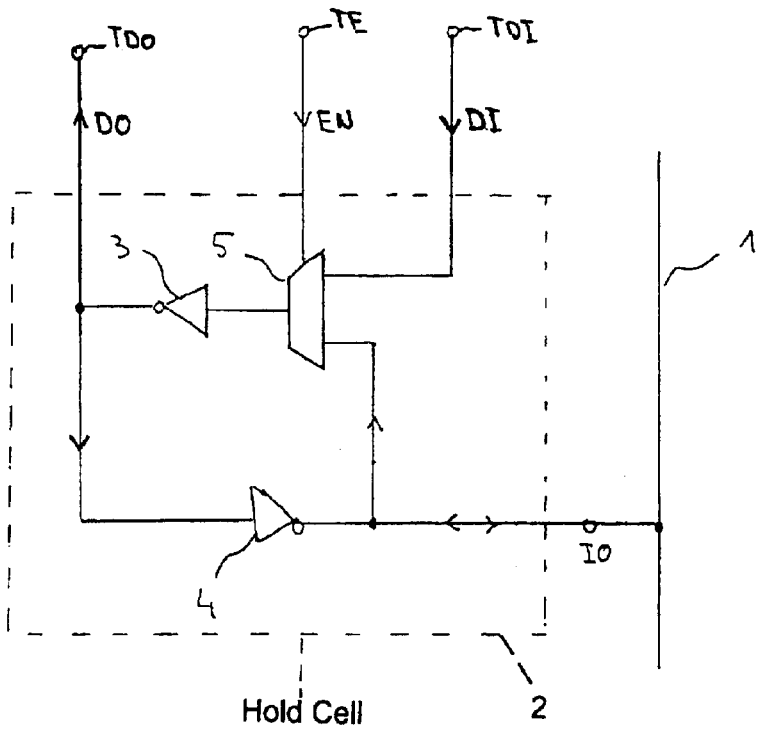
FIG. 3 is a circuit diagram of the bus signal hold cell shown in FIG. 2 with an additional serial data output.

FIG. 3 represents a circuit diagram of a development of the bus signal hold cell 2. As compared to the bus signal hold cell 2 in FIG. 2, here the bus signal hold cell 2 additionally includes a serial data output TDO. The condition of the bus signal hold cell 2 can be read via the data output TDO at any time. For instance, in the normal mode the condition of the bus signal hold cell 2 can be determined via the data output TDO. In addition, in the test mode, the data response DO can be read that results from a data signal input to the data input TDI.

Figure 4:
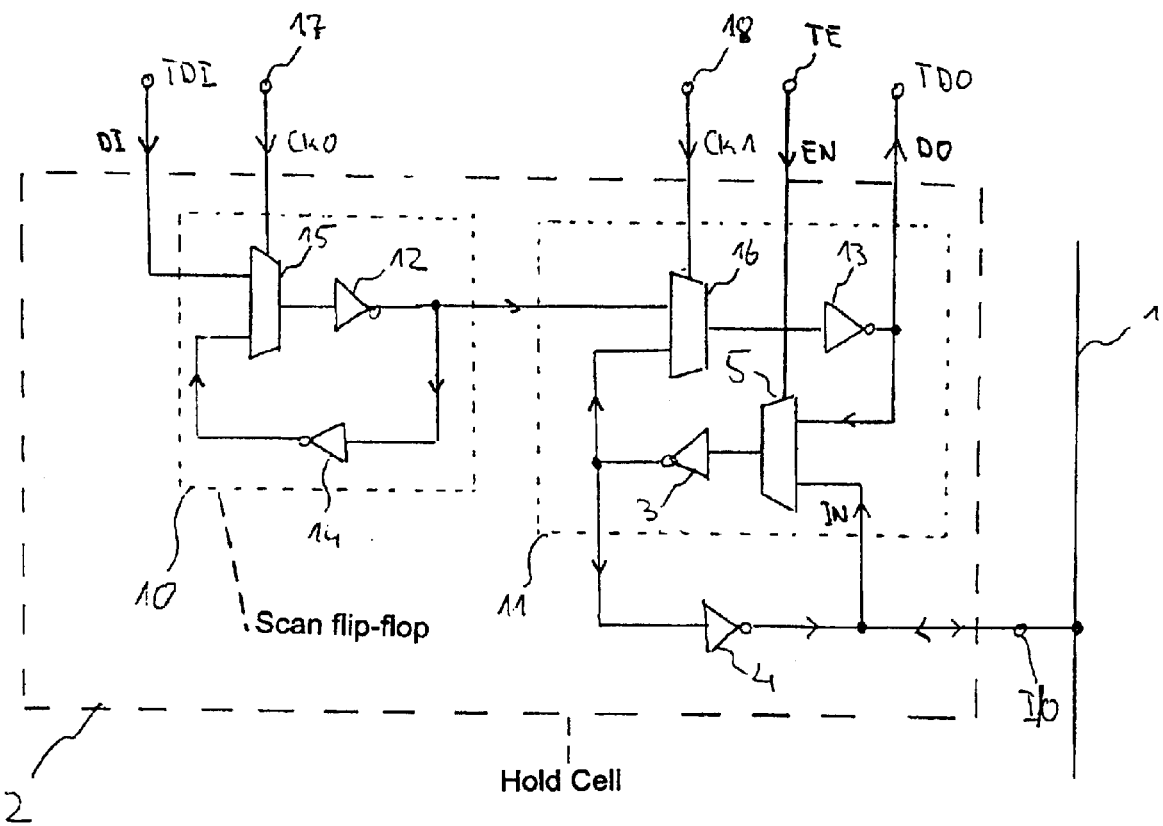
FIG. 4 is a circuit diagram of a unique development of the bus signal hold cell shown in FIG. 3.

FIG. 4 shows a circuit diagram of a particular development of the bus signal hold cell shown in FIG. 3. The bus signal hold cell in FIG. 4 includes a shift register arrangement, which, in the present exemplary embodiment, is realized as two scan flip-flops or latches 10, 11 configured in series. The input of the first latch 10 is connected to the additional data input TDI, whereas the output of the first latch 10 controls the first input of the in-series second latch 11. The output of the second latch 11 is connected to the additional data output TDO and to an input of the multiplexer 5.

Each latch 10, 11 includes a first inverter 12, 13 in its signal path and a second inverter 3, 14 in its feedback path. A respective multiplexer 15, 16 is connected to the input of one of the inverters 12, 13. The output signal of the feedback inverter 3, 14 and the latch input signal are applied to the inputs of the multiplexers 15, 16, respectively. The multiplexers 15, 16 are controlled via a clock signal CK0, CK1. The test cycle, i.e. the clock of the control signals CK0, CK1 which are applied via the control inputs 17, 18, can be derived from the system clock of the integrated circuit in connection with the control signal EN of the bus signal hold cell.

In a particularly advantageous development, the feedback inverter 3 of the latch 11 on the output side is simultaneously the first inverter 3 of the bus signal hold cell 2. The output signal D0 of the output-side latch 11 or a bus signal IN can thus be supplied to this inverter via the multiplexer 5.

Only two latches 10, 11 are provided in this exemplary embodiment, though a greater or lesser number of latches 10, 11 can be provided, depending on the application. Beyond this, the shift register arrangement could be realized as any arrangement.

Figure 5:
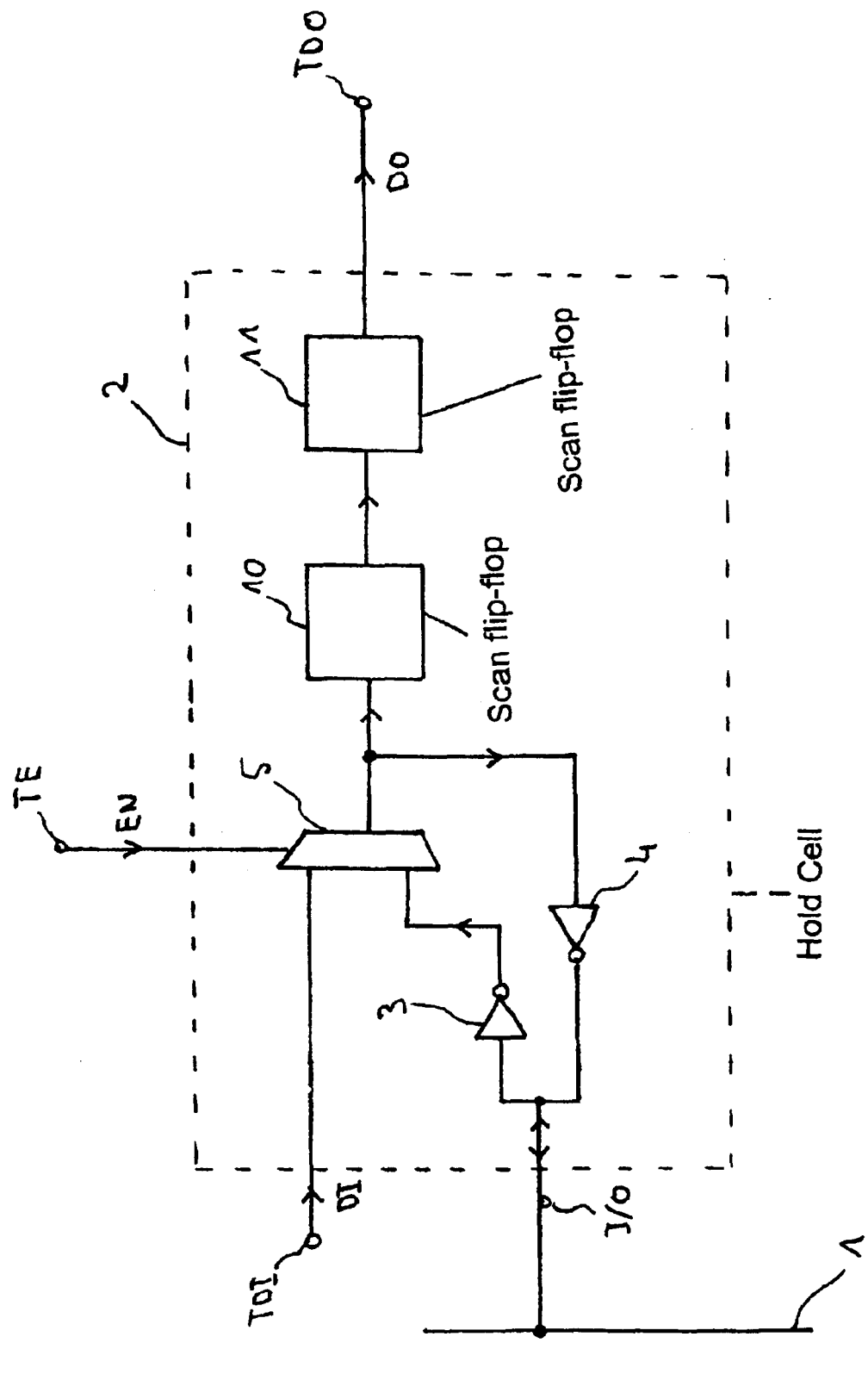
FIG. 5 is a circuit diagram of a simplified development of the bus signal hold cell shown in FIG. 3.

FIG. 5 is a circuit diagram of a development of the bus signal hold cell 2 which has been simplified compared to that in FIG. 4. The bus signal hold cell is furnished with two standard scan flip-flops 10, 11 in series, which are interposed between the data input TDI and the data output TDO. The output of the multiplexer 5 is connected to the in-series flip-flops 10, 11. One input of the multiplexer 5 is connected to the data input TDI and another input of the multiplexer 5 is connected, via the input/output I/O and the inverter 3, to the bus line 1. The output of the multiplexer 5 is connected to the first flip-flop 10, whereby the multiplexer output signal can be fed to the input/output I/O, and thus to the bus line 1 via the feedback branch and via the inverter 4 simultaneously.

The bus signal hold cell according to FIGS. 4 and 5 supports the testing of the bus lines of a scan-based integrated circuit wherein an automatic test pattern generation (ATPG) is utilized.

Figure 6:
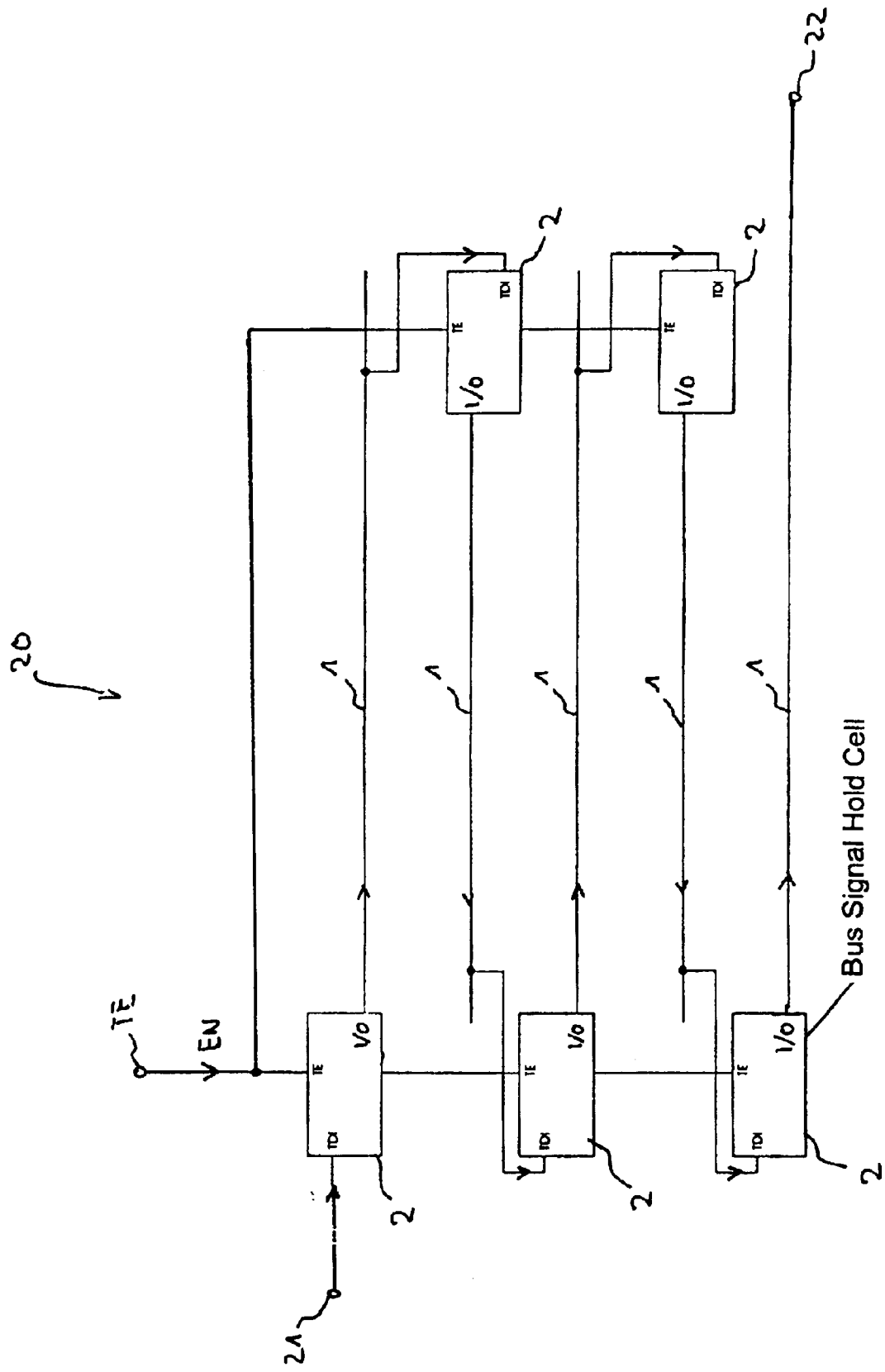
FIG. 6 is a bus system having bus lines that are interconnected into a single signal line using the inventive bus signal hold cells.

FIG. 6 is a block circuit diagram representing an advantageous application of a number of the inventive bus signal hold cells 2 for testing highly complex bus systems.

The bus system shown in FIG. 6 includes a bus 20 with five bus lines 1 and bus signal cells 2 that are allocated to these bus lines 1. The bus signal hold cells 2 are represented as blocks, but they can be realized according to any of the embodiments shown in FIGS. 2 to 4. The bus signal hold cells 2 are connected to a bus line 1 via their primary input/output I/O, respectively. Beyond this, each bus signal hold cell 2 is connected to another bus line 1 (advantageously a neighboring line) via the additional data input TDI. FIG. 6 thus represents a bus system whose bus lines 1 are interconnected into a single signal line using the inventive bus signal hold cells 2. So coupled, the bus lines 1 and the bus signal hold cells 2 produce a single contiguous unidirectionally operable signal line having an input 21 to which test data can be applied and having a test response that can be read at an output 22.

The functioning of the inventive bus signal hold cells—that is to say, the bus system which is equipped with bus signals hold cells 2 of this type—will now be described in detail:

Controllability:

The inventive method can be implemented to enable the testing of bus lines using bus signal hold cells 2. This is accomplished using a control or synchronization signal EN. Via the control signal EN, the bus signal hold cell 2 is switched into test mode. All other signal sources that can write data onto the bus line, for instance subscribers which are connected to the bus line, are deactivated. Using the additional data input TDI, a strictly prescribed test value (test signal DI) can then be inserted into the bus signal hold cell 2 and thus written onto the allocated bus line 1.

Observability:

Using the additional data output TDO, the bus condition can be observed in test mode. The bus signal hold cells 2 store the present condition on the bus line 1, i.e. at the bus signal hold cell 2, at a defined time. To this end, a test signal DI which is to be observed is written onto a bus line 1. The bus signal hold cell 2 stores this item of test data DI, preferably in a latch. The test data DI is forwarded to the additional output TDO of the bus signal hold cell 2 and can then be compared to the expected test response.

The bus signal hold cell can be configured such that it loses its sequential behavior and lays a combinatorial signal path between the primary bus terminal and the additional data output. Alternatively, the bus signal hold cell can also be configured in such a way that it loses its sequential behavior and lays a combinatorial path between the additional data input and the primary bus terminal.

Test Operation Given One Bus Line:

The test patterns are written into a test pattern source having an output that is connected to the bus line. This test pattern source can be the output of a macromodule, the output of a bus signal hold cell in test control mode, or an externally generated test signal. The test pattern source writes the test pattern onto the bus line. The test patterns that are written onto the bus are stored in the bus signal hold cells.

The test response signals are compared to the expected values that are expected. This can be accomplished in that the test pattern is read from the circuit serially, forwarded to a data output via multiplexers, compressed into a signature, or forwarded to an additional bus line that is to be tested. The comparison occurs via a bus signal hold cell, a macromodule or a signal output of the integrated circuit. The macromodule must be constructed in such a way that it generates the appropriate test patterns itself.

In the case of a bus structure, the above described test can also be performed in parallel fashion.

Test Operation Given a Plurality of Bus Lines:

For testing a plurality of bus lines of a bus, the above described methods can be appropriately combined. This can occur as follows:

The bus signal hold cells are so arranged that one or more serial signal lines emerge, which connect different bus lines to one another in the test mode. The signal path of a signal line can advantageously contain storage elements, macromodules, or combinatorial elements. The circuit is so configured that an item of test data is applied at the input of the serial signal line or lines. All other subscribers which are connected to the bus lines and can write onto the bus lines in normal mode are deactivated in test mode. The test data which is coupled in on the input side is forwarded by the interconnected bus lines. At the output of the serial signal line, the test response signal, i.e. its signal value, the time delay and/or the signal shape, can be observed.

Test Operation Given a Plurality of Macromodules:

For purposes of testing macromodules, a plurality of macromodules are interconnected by bus lines as follows:

The macromodules are so constructed that bus signal hold cells are placed at their data inputs and outputs. A test sequence control appropriately configures the macromodules in the test mode. For the testing of the buses/bus lines between the macromodules, the bus signal hold cells are active and all other drivers that are connected to the buses/bus lines are inactive. The bus lines can be tested by the above described testing methods. For the testing of a macromodule, the bus signal hold cells are configured as test data sources at their data inputs and as test data sinks at their data outputs. All other signal sources at the data inputs are deactivated.

In sum, by providing a new bus signal hold cell that includes an additional data input and/or data output, the testability, i.e. the controllability and observability, can be significantly enhanced.

The present invention has been laid out in a manner that best illustrates the principle of the invention and its practical application, however, the invention can of course be modified by the expert in many ways.

What is claimed is:

1. An integrated bus signal hold cell, comprising:
   a common input/output for coupling with a bus line;
   at least a first inverter and a second inverter for holding a last condition of the bus line, each one of said first inverter and said second inverter having an output and an input, said output of said first inverter coupled to said input of said second inverter, said output of said second inverter coupled to said input of said first inverter; and
   an additional input for inputting a defined test signal;
   an additional output for providing a test response signal in response to the defined test signal input to said additional input;
   said input of said first inverter coupled with said input/output; and
   said output of said second inverter coupled with said input/output.

2. The bus signal hold cell according to claim 1, comprising:
   a shift register configuration connected between said additional input and said additional output.

3. The bus signal hold cell according to claim 2, wherein said shift register configuration includes a plurality of elements selected from the group consisting of scan flip-flops and latches.

4. The bus signal hold cell according to claim 2, comprising:
   a multiplexer;
   said shift register configuration including a plurality of latches;
   each one of said plurality of said latches including a signal path with a third inverter therein and a feedback path with a fourth inverter therein;
   said third inverter providing an output signal being fed by said fourth inverter in an inverted form to said multiplexer;
   said multiplexer having an output connected to said third inverter.

5. The bus signal hold cell according to claim 4, wherein:
   one of said plurality of said latches defines an output-side latch; and
   said fourth inverter in said feedback path of said output-side latch forms said first inverter.

6. An integrated bus signal hold cell, comprising:
   a common input/output for coupling with a bus line;
   at least a first inverter and a second inverter for holding a last condition of the bus line, each one of said first inverter and said second inverter having an output and an input, said output of said first inverter coupled to said input of said second inverter, said output of said second inverter coupled to said input of said first inverter; and
   an additional input for inputting a defined test signal;
   said input of said first inverter coupled with said input/output;
   said output of said second inverter coupled with said input/output; and
   said first inverter having a higher drive power than said second inverter.

7. An integrated bus signal hold cell, in combination with drivers that are connected to the bus line, comprising:
   a common input/output for coupling with a bus line;
   at least a first inverter and a second inverter for holding a last condition of the bus line, each one of said first inverter and said second inverter having an output and an input, said output of said first inverter coupled to said input of said second inverter, said output of said second inverter coupled to said input of said first inverter; and
   an additional input for inputting a defined test signal;
   said input of said first inverter coupled with said input/output;
   said output of said second inverter coupled with said input/output; and
   said second inverter having a lower drive power than said drivers that are connected to the bus line.

8. An integrated bus signal hold cell, comprising:
   a common input/output for coupling with a bus line;
   at least a first inverter and a second inverter for holding a last condition of the bus line, each one of said first inverter and said second inverter having an output and an input, said output of said first inverter coupled to said input of said second inverter, said output of said second inverter coupled to said input of said first inverter; and
   an additional input for inputting a defined test signal;
   said input of said first inverter coupled with said input/output;
   said output of said second inverter coupled with said input/output;
   a multiplexer having an output connected to said first inverter;
   said multiplexer being coupled with said input/output and said additional input;

said multiplexer being controlled by a control signal to switch a selected signal through to said output of said multiplexer.

9. An integrated bus system, comprising:

a bus including at least one bus line having a high-resistance state and a low-resistance state;

at least one subscriber connected to said bus line, said subscriber for performing an operation selected from the group consisting of writing signals onto said bus line and reading signals from said bus line; and at least one bus signal hold cell connected to said bus line;

said bus signal hold cell including:
 a common input/output coupled with said bus line,
  at least a first inverter and a second inverter for holding a last logic state of said bus line, each one of said first inverter and said second inverter having an output and an input, said output of said first inverter coupled to said input of said second inverter, said output of said second inverter coupled to said input of said first inverter, and
 an additional output,
 an additional input for inputting a defined test signal, said input of said first inverter coupled with said input/output, and
 said output of said second inverter coupled with said input/output; and said bus signal hold cell storing the last logic state on said bus line in the high-resistance state of said bus line.

10. The bus system according to claim 9, comprising:

a plurality of bus lines; and a plurality of bus signal hold cells;

each one of said plurality of said bus signal hold cells having an additional input, an additional output, and a common input/output; and each one of said plurality of said bus signal hold cells being coupled with a respective one of said plurality of said bus lines using said additional input thereof and a connection selected from the group consisting of said additional output thereof and said input/output thereof in a manner such that said plurality of said bus lines are interconnected into a single contiguous signal line.

11. The bus system according to claim 9, wherein:

said bus line has an end; and said bus signal hold cell is connected at said end of said bus line.

12. The bus system according to claim 9, comprising:

a plurality of bus lines; and said bus signal hold cell capable of being coupled with any one of said plurality of said bus lines using said additional input and a connection selected from the group consisting of said additional output and said common input/output.

13. The bus system according to claim 9, wherein bus system is configured for testing scan-based integrated circuits.

14. A method for driving an integrated bus signal hold cell, which comprises:

providing a bus line having a high-resistance state and a low resistance state;

providing a bus signal hold cell including:
 a common input/output coupled with the bus line,
  at least a first inverter and a second inverter for holding a last signal driven over the bus line, each one of the first inverter and the second inverter having an output and an input, the output of the first inverter coupled to the input of the second inverter, the output of the second inverter coupled to the input of the first inverter, and
 an additional output,
 an additional input for inputting a defined test signal, the input of the first inverter coupled with the input/output, and
 the output of the second inverter coupled with the input/output;

providing the bus signal hold cell with an operating mode in which, when the bus line is in the high-resistance state, the last signal that, was driven over the bus line is saved in the bus signal hold cell; and providing the bus signal hold cell with a test mode, in which the defined test signal is written into the bus signal hold cell using the additional input.

15. The method according to claim 14, which comprises:

in the test mode, generating a test response signal in response to the test signal; and providing the test response signal at an additional output of the bus signal hold cell.

16. The method according to claim 14, which comprises:

in the test mode, generating a response signal in response to a bus signal applied to the common input/output; and providing the test response signal at an additional output of the bus signal hold cell.

17. The method according to claim 14, which comprises:

interconnecting a plurality of bus lines of a bus into a single contiguous signal line using a plurality of bus signal hold cells;

writing an item of test data into the interconnected signal line using a first input of the interconnected signal line; and reading out a test response signal at an output.

* * * * *